(12) United States Patent
Stevens et al.

(10) Patent No.: US 7,218,975 B2
(45) Date of Patent: May 15, 2007

(54) INTEGRATED MILL

(75) Inventors: Ray Stevens, Salmon Arm (CA); Lyle Baker, Salmon Arm (CA)

(73) Assignee: COE Newnes/McGehee Inc., Salmon Arm (CA)

( * ) Notice: Subject to any disclaimer, the term of this patent is extended or adjusted under 35 U.S.C. 154(b) by 15 days.

(21) Appl. No.: 11/269,609

(22) Filed: Nov. 9, 2005

(65) Prior Publication Data

US 2006/0096667 A1    May 11, 2006

Related U.S. Application Data

(60) Provisional application No. 60/625,982, filed on Nov. 9, 2004.

(51) Int. Cl.
   G05B 19/18   (2006.01)
   A01G 23/08   (2006.01)
   B23Q 15/00   (2006.01)

(52) U.S. Cl. .................... 700/65; 144/335; 144/356

(58) Field of Classification Search .......... 700/65, 700/36; 144/335, 3.1, 336, 34.1, 382, 4.1, 144/358, 356; 707/104.1, 7
See application file for complete search history.

(56) References Cited

U.S. PATENT DOCUMENTS

| | | | |
|---|---|---|---|
| 3,533,458 A * | 10/1970 | McColl | 144/337 |
| 6,182,725 B1 * | 2/2001 | Sorvik | 144/335 |
| 6,341,632 B1 * | 1/2002 | Sorvik | 144/335 |
| 6,671,698 B2 * | 12/2003 | Pickett et al. | 707/104.1 |
| 6,772,546 B2 | 8/2004 | Latschbacher et al. | |
| 7,100,817 B2 * | 9/2006 | Leger et al. | 235/375 |
| 2004/0250908 A1 * | 12/2004 | Hicks | 144/335 |
| 2005/0133115 A1 * | 6/2005 | Gatz | 144/357 |
| 2005/0197175 A1 * | 9/2005 | Anderson | 460/1 |

FOREIGN PATENT DOCUMENTS

| | | |
|---|---|---|
| CA | 2309408 | 5/1999 |
| DE | 4134790 | 4/1993 |
| DE | 4232412 | 3/1994 |
| DE | 19807284 | 9/1999 |
| DE | 19912806 | 9/2000 |
| EP | 0 535 919 A2 | 7/1993 |
| WO | WO 02/044865 | 6/2002 |
| WO | WO 02/071832 | 9/2002 |

\* cited by examiner

Primary Examiner—Thomas K. Pham
(74) Attorney, Agent, or Firm—Antony C. Edwards

(57) ABSTRACT

A ystem for localizing and optimizing harvesting of trees or stands of trees, using locating devices for tracking same over time, and geographically tracking same once harvested, and for providing such information to users. Sensors may be provided along with the locator devices in association with each tree or block of trees for sensing characteristics of the tree or block of trees and/or characteristics of the location of such trees.

21 Claims, 3 Drawing Sheets

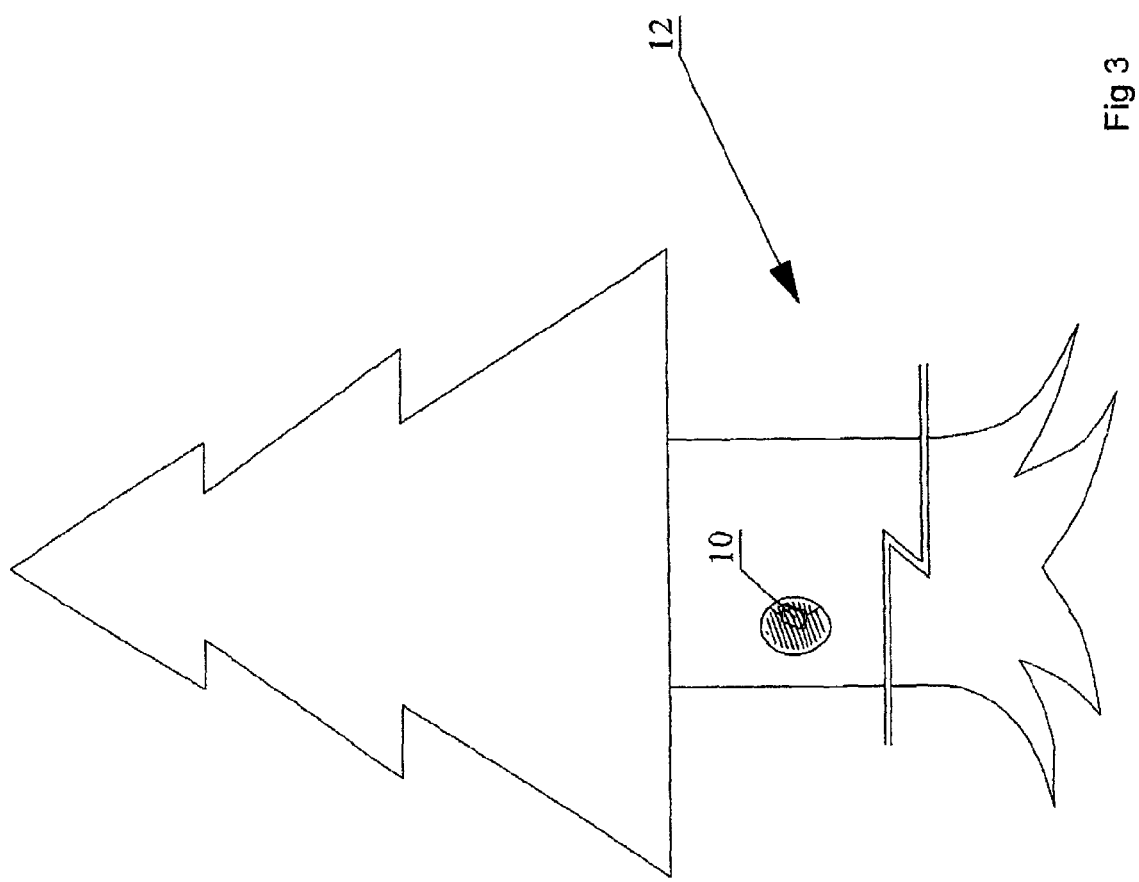

INTEGRATED MILL

CROSS REFERENCE TO RELATED APPLICATION

This application claims priority from U.S. Provisional Patent Application No. 60/625,982 filed Nov. 9, 2004 entitled Integrated Mill.

FIELD OF THE INVENTION

This invention relates to the field of monitoring trees, and more particularly, it relates to a system for localizing trees and sensing data relating to same.

BACKGROUND OF THE INVENTION

Global Positioning Satellite (GPS) locators are well known in the prior art. Processors within small GPS signal receivers triangulate or otherwise convert information from GPS satellites in orbit around the earth to provide relatively accurate positioning coordinates. Thus a microprocessor chip containing a GPS receiver provides position coordinates in real time for the instantaneous location of the chip. One example of the present use of such chips (hereinafter "GPS chips") is within cellular phones, thereby enabling the tracking and location of individual cellular phones.

In the prior art applicant is aware of:

Canadian Patent Application No. 2,309,048 (WO09923873) to Sorvik entitled "Method for Timer Harvesting and System for Forestry" whereby a GPS controlled harvester cuts trees and marks them according to location, quality, etc. This data on the cut logs is further used in sawmill processing into lumber.

U.S. Pat. No. 6,772,546 to Latschbacher et al. entitled "Marking Element for Marking Timber, Especially Tree Trunks" discloses a transponder device located on a tree to be used in locating identifying and classifying the trees and then identifying the lumber for transporting and processing the tree into lumber. In particular the following is taught by Latschbacher et al.:

In the practical application, with a marking tag 10 that is already secured to a log, the required or desired data for this log or round timber are entered by an operator equipped with a portable transmit and receive unit. The data may be, for example, the log serial number, a log sub-number, the wood type, the length, the diameter, the quality class, and the like. The name of the forest enterprise, the name of the logger and the name of the log mover may additionally be entered as well, and later also the name of the transportation firm. This makes it possible to wirelessly identify the log again later at any time, be it during storage, inventory, marking of sawed timber packages, loading of trucks (loading list) and the like. A loading list of this type, for example, is then created automatically by reading the transponders while the truck or the like is being loaded. The data of the individual logs can then, for example, also be wirelessly transmitted to an active transponder on truck and recorded by the same, so that, for example, when the truck enters onto the site of a processing plant, the loading list is immediately wirelessly transmitted, for example at the factory gate. The announced list can then be compared electronically to the actual list. Added and removed logs can easily be recorded automatically for stock keeping. When the timber is cut in a lumber-mill, the cut timber can be accounted for automatically and a yield calculation (also per log) and stock deduction can be performed automatically. In the forest itself, inventory can easily be taken for the forester or round timber can easily be transferred to a buyer.

DE 19807284 "Registration and Management Device for Trees" and DE 19912806 "Device for Registration and Management of Trees Consists of Screw with Head Containing Transponder" indicates a GPS based system for managing tree stock by identifying trees with individual embedded transponders.

EP 535919 claims a method of identifying wooden objects by installing through penetration active or passive transponders to communicate with locating units.

WO0244865 notes an application of GPS to individual tree identification, growth and watering, in which GPS units are proximate individual trees and relay identification and environmental data.

WO02071832 discloses an automated aerial method of timber cruising in which GPS units are dropped from aircraft to delineate timber survey areas.

DE423412 relates to a portable data acquisition unit including GPS systems to assist workers in locating and quantifying tree stands.

DE4134790 indicates a GPS based system for logging small trees with a robotic vehicle.

SUMMARY OF THE INVENTION

The first aspect of the invention is based upon the realization that it is possible by means of remote registration and analysis techniques to create very detailed and precise data bases concerning characteristics of a forest stand, the tree stand itself being included as well as the geographical and geological conditions therein. In the data base thus achieved, which may be said to involve an accurate and exact reproduction of the forest stand, the individual tree positions are intended to be determined with accuracy. Furthermore, each individual tree may be carefully estimated with regard to its wood quality and contents. As an example, it may be mentioned that the resolution of the data base should be such that a silvicultural planner by means of a computer should be able to select an individual tree and perhaps view the tree or simulation thereof allowing for expected growth, etc and also may be used to achieve a computer based cross-cutting prognosis. In this connection the invention aims at creating conditions for a very accurate and rapid follow-up of the harvesting plan by feed-back of real harvesting data.

The analysis of the timber stand taken place before the harvesting is also intended to be carried out through the remote analysis technique. Thus each individual tree may be unambiguously determined with respect to its position and may also be forecasted with accuracy with respect to its timber quality and volume. Such an accurate analysis in advance means conditions for a very accurate calculation of the yield of a certain harvesting in advance. Furthermore, the harvesting may be targeted and controlled so that only the exact trees are harvested for an optimum result. According to the invention a computer arrangement may be provided on the harvesting machine, adapted to control or to provide information to assist in controlling the harvesting machine on the basis of data emanating from the pre-analysis of the forest region and harvesting instructions determined on the basis thereof so that only the exact trees determined in advance are harvested. Such a high resolution, that is at the level of a single tree, may be achieved if an accurate registration of the forest is carried out be means of a photographical or other remote registration techniques are employed and these registrations are accurately to geographically recorded. Furthermore, a very high resolution is required with respect to the position determining device arranged on the harvesting machine. Such a high resolution is today already obtainable by means of the satellite-based Global Positioning System (GPS) and GPS derivatives (DGPS, etc).

In summary, the present invention may be characterized in one respect as a system for localizing and optimizing harvesting of trees or stands of trees, using locating devices for tracking same over time, and geographically tracking same once harvested, and for providing such information to users. Sensors may be provided along with the locator devices in association with each tree or block of trees for sensing characteristics of the tree or block of trees and/or characteristics of the location of such trees. The system may thus include:

(i) firstly, a plurality of remote identification, localizing and sensing devices associated with, for example by mounting to, the trees, each remote localizing and sensing device including:
  a) a localization receiver for receiving GPS localization signals; and in one embodiment one or more sensors for providing sensor data from the sensors relating to characteristics of the trees or their location; memory for storing the data values obtained from one or more of the sensors and to the identity the location of the locator devices;
  b) a processor for processing the localization signals and data values so as to provide location data and sensor data; and
  c) a transmitter for communicating the location data and the sensor data to a remote server computer;
  d) a plurality of users in electronic communication via a plurality of user interface devices with the server computer for selectively receiving and remotely further processing the location data and the sensor data for select trees or blocks of trees;

and;
(ii) secondly, a server computer including:
  a) a database for maintaining the identity, location and sensor data and for associating each user with a particular, or particular group of, remote localizing and sensing devices and for providing selective access of the users to the database;
  b) a query or order processor for:
    (1) processing requests for lumber according to specification given in the query or order,
    (2) locating and matching trees or groups of trees in the database matching the specifications,
    (3) reporting the matches to the users,
    (4) upon a payment or verified instructions from authorized users:
      (i) forwarding a harvesting order to a harvester
      (ii) forwarding a processing order to a sawmill
  c) a tracking processor for tracking the trees or group of trees flagged for harvesting and processing by the monitoring of the location data for the tree to match the trees to a transportation and production schedule for the sawmill in order to timely fill the order for the user.

The remote devices may also process the sensor data, and the transmitter communicates the processed sensor data. The database further maintains the processed sensor data, and the tracking and optimizing processor factors in the processed sensor data in determining an optimized harvesting plan for the individual trees or blocks of trees in order to accomplish the production schedule.

Means may be provided for remote registration of the remote devices with, so as to remotely gather the location data and provide same to, the server computer. The means for remote registration may include an aerial survey by a remote vehicle such as an airborne vehicle remote from the individual trees or blocks of trees.

The sensor data may include characteristics of a forest stand surrounding the individual tree or block of trees as well as the geographical and geological conditions associated with the forest stand. The database may include a reproduction of the forest stand, including individual tree positions of the individual trees or blocks of trees. The database may also include estimates of wood quality and volume of the individual trees or blocks of trees. The database may provide for selecting an individual tree so as to review its characteristics, wherein the characteristics may include expected growth.

The tracking and optimizing processor may maintain a harvesting plan by feed-back of harvesting data from the database and may coordinate the harvesting plan with the production schedule so as to optimize efficiency and resources. Thus a means may be provided for analyzing, targeting and controlling a harvest according to the harvest plan, such as a means for calculation of the yield of the harvesting plan in advance of harvesting. The means for analyzing, targeting and controlling a harvest may also include a computer arrangement provided on a harvesting machine, adapted to control or to provide information to assist in controlling the harvesting machine on the basis of data emanating from a pre-analysis of a forest stand and harvesting instructions determined on the basis thereof so that only exact trees determined in advance are harvested.

BRIEF DESCRIPTION OF THE DRAWINGS

FIG. 3 is an enlarged view from FIG. 1 showing a partially cut-away tree having a GPS chip mounted therein.

DETAILED DESCRIPTION OF EMBODIMENTS OF THE INVENTION

Figure 1:
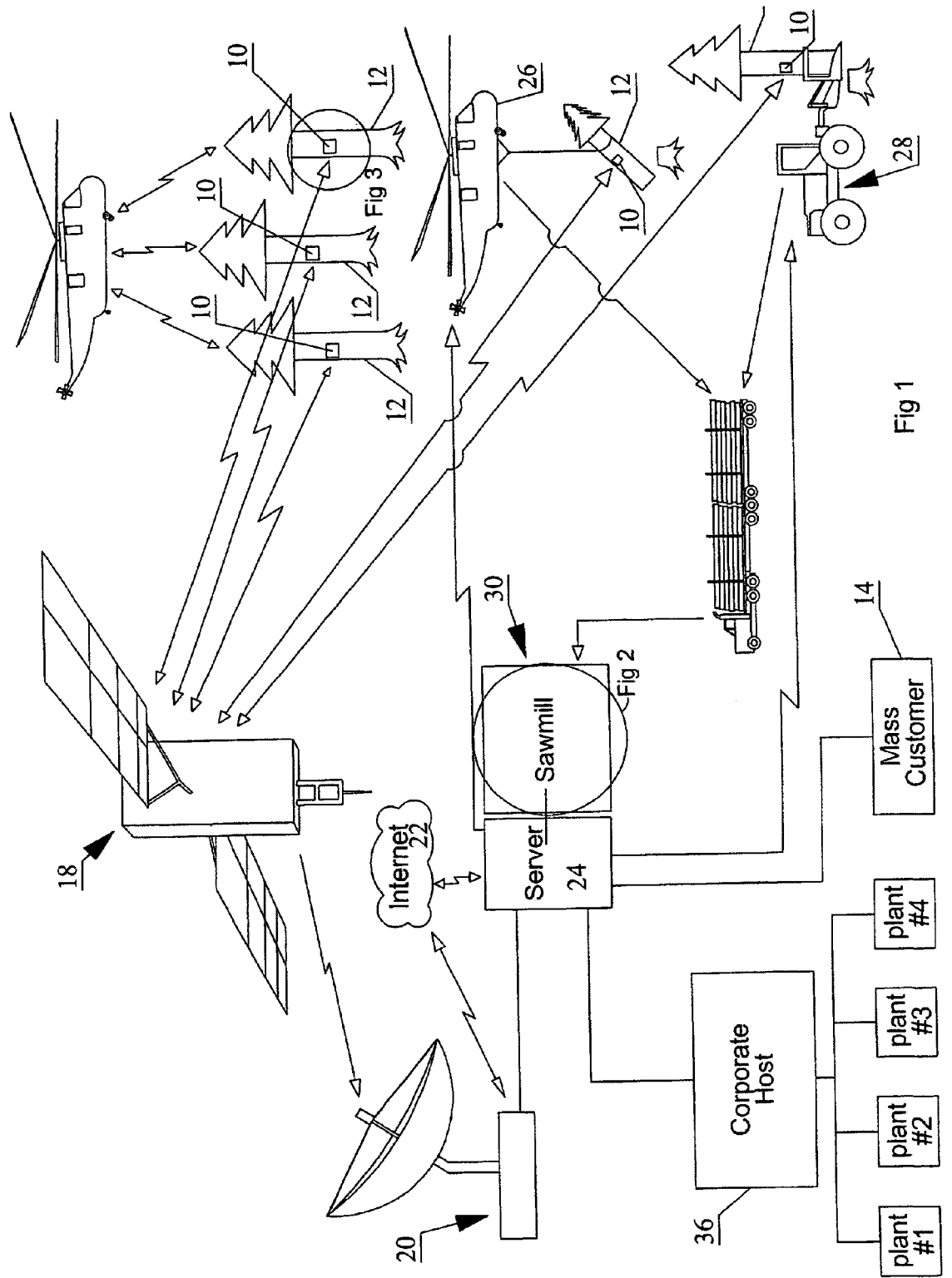
FIG. 1 is a diagrammatic view of the system according to one aspect of the present invention.
Figure 2:
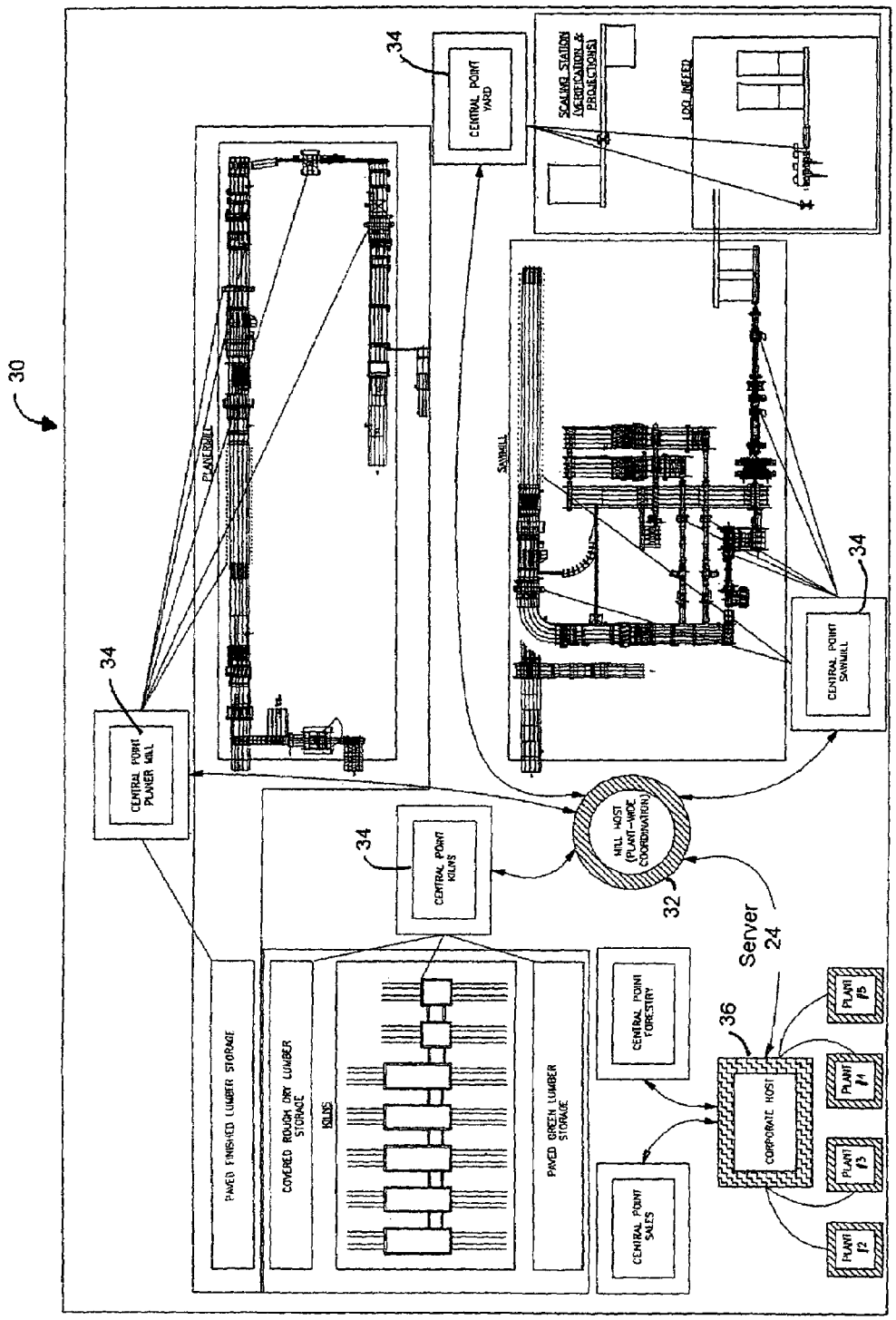
FIG. 2 is a diagrammatic view of a sawmill layout in the embodiment of FIG. 1.

In the present invention, and as illustrated in the accompanying Figures, GPS chips 10 are mounted to or embedded in live, for example old growth, trees 12 or tagged to young trees. GPS chips 10 provide a reference identity for each individual tree, or block of trees, to allow for location of the tree or block of trees for timely felling, transportation, processing, delivery, sale and use by an end consumer 14 in a flow path which may be tracked extending from growth forest 16 to end-use, for example in a building structure.

In one embodiment, information other than merely reference identity is provided by the GPS chip. For example, the information provided by GPS chip 10 may include species, year of planting if applicable, terrain information such as for example elevation, grade or slope, all of which information may be useful in predicting tree growth and difficulties which may be encountered for harvesting. The information is transmitted via GPS or other satellites 18 or via polling and/or repeater stations to a transfer station 20 and, for example using the internet 22, on to a central computer or server 24 so that updated information on availability of the trees or blocks of trees is maintained by the server or in slave computers or memory cooperating with the server.

Trees 12 may then be harvested by conventional means, such as by helicopter 26 or harvester 28 and transported by air or road to a sawmill 30. The choice of sawmill, delivery, timing etc may be optimized by server 24 according to the status of the sawmills as monitored by server 24, for example as communicated to server 24 by the mill-host servers 32. Mill-host servers provide mill-wide co-ordination by interacting with the machine-center specific processors 34, such as the kilns, sawmill, planermill and yard central-point processors each monitoring and/or controlling specific machine centers such as curve sawing machines in the sawmill etc. Server 24 communicates with the sawmill mill-host servers 32 and with the corporate host. The server or corporate host 36 communicates with the sales and forestry servers, the former of which supply projections of the required mill output; the latter which supply the timber information, including from GPS chips 10, providing for optimized harvesting.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for localizing and optimizing harvesting of trees or stands of trees, the system comprising:
   (i) a plurality of identification and localizing remote devices associated with individual trees or individual blocks of trees, each remote device including:
      a) a localization receiver for receiving GPS localization signals;
      b) a processor for processing the localization signals so as to provide location data; and
      c) a transmitter for communicating the location data to a remote server computer;
      d) a plurality of users in electronic communication via a plurality of user interface devices with the server computer for selectively receiving and remotely further processing the location data for select trees or blocks of trees of the individual trees or said individual blocks of trees;
   and;
   (ii) a server computer including:
      a) a database for maintaining the identity, and location data and for associating each user with a particular, or particular group of, remote devices and for providing selective access of the users to the database;
      b) a tracking and optimizing processor for tracking the location of the trees or group of trees before and after harvesting, and for optimized processing by the monitoring of the location data for the individual trees or blocks of trees to match the trees or blocks of trees to a transportation and comparison of a production schedule for a sawmill in order to timely fill an order for lumber to be produced by the sawmill according to the production schedule, and for coordinating harvesting to accomplish the production schedule.

2. The system of claim 1 wherein said each remote device further includes one or more sensors for providing sensor data; memory for storing the data values pertaining to one or more of the sensors and to the identity and location of the device.

3. The system of claim 1 wherein said server computer further includes a query or order processor for:
   (1) processing requests for lumber according to specification given in the query or order,
   (2) locating and matching trees or groups of trees in the database matching the specifications,
   (3) reporting the matches to the users,
   (4) upon a payment or verified instructions from authorized users:
      (i) forwarding a harvesting order to a harvester
      (ii) forwarding a processing order to a sawmill.

4. The system of claim 2 wherein said server computer further includes a query or order processor for:
   (1) processing requests for lumber according to specification given in the query or order,
   (2) locating and matching trees or groups of trees in the database matching the specifications,
   (3) reporting the matches to the users,
   (4) upon a payment or verified instructions from authorized users:
      (i) forwarding a harvesting order to a harvester
      (ii) forwarding a processing order to a sawmill.

5. The system of claim 2 wherein said processor in said remote devices also processes said sensor data, and wherein said transmitter also communicates processed sensor data processed from said sensor data, and wherein said database further maintains said processed sensor data, and wherein said tracking and optimizing processor factors in said processed sensor data in determining an optimized harvesting plan for said individual trees or blocks of trees in order to accomplish said production schedule.

6. The system of claim 4 wherein said processor in said remote devices also processes said sensor data, and wherein said transmitter also communicates processed sensor data processed from said sensor data, and wherein said database further maintains said processed sensor data, and wherein said tracking and optimizing processor factors in said processed sensor data in determining an optimized harvesting plan for said individual trees or blocks of trees in order to accomplish said production schedule.

7. The system of claim 1 further comprising means for remote registration of said remote devices with, so as to remotely gather said location data and provide same to, said server computer.

8. The system of claim 7 wherein said means for remote registration includes an aerial survey by a remote vehicle remote from the individual trees or blocks of trees.

9. The system of claim 8 wherein said remote vehicle is an airborne vehicle.

10. The system of claim 5 further comprising means for remote registration of said remote devices with, so as to remotely gather said location data and provide same to, said server computer.

11. The system of claim 10 wherein said means for remote registration includes an aerial survey by a remote vehicle remote from the individual trees or blocks of trees.

12. The system of claim 11 wherein said remote vehicle is an airborne vehicle.

13. The system of claim 5 wherein said sensor data includes characteristics of a forest stand surrounding the individual tree or block of trees as well as the geographical and geological conditions associated with said forest stand.

14. The system of claim 13 wherein said database includes a reproduction of said forest stand, including individual tree positions of the individual trees or blocks of trees.

15. The system of claim 5 wherein said database includes estimates of wood quality and volume of the individual trees or blocks of trees.

16. The system of claim 5 wherein said database provides for selecting an individual tree so as to review its characteristics.

17. The system of claim 16 wherein said characteristics include expected growth.

18. The system of claim 1 wherein said tracking and optimizing processor maintains a harvesting plan by feedback of harvesting data from said database and coordinates said harvesting plan with said production schedule.

19. The system of claim 18 further comprising means for analyzing, targeting and controlling a harvest according to said harvest plan.

20. The system of claim 19 wherein said means for analyzing includes means for calculation of the yield of said harvesting plan in advance of harvesting.

21. The system of claim 19 wherein said means for analyzing includes a computer arrangement provided on a harvesting machine, adapted to control or to provide information to assist in controlling the harvesting machine on the basis of data emanating from a pre-analysis of a forest stand and harvesting instructions determined on the basis thereof so that only exact trees determined in advance are harvested.

* * * * *